United States Patent
Kato et al.

(10) Patent No.: US 11,271,213 B2
(45) Date of Patent: Mar. 8, 2022

(54) NEGATIVE ELECTRODE

(71) Applicant: Toyota Jidosha Kabushiki Kaisha, Toyota (JP)

(72) Inventors: Masaki Kato, Toyota (JP); Koji Takahata, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 16/741,375

(22) Filed: Jan. 13, 2020

(65) Prior Publication Data

US 2020/0227755 A1    Jul. 16, 2020

(30) Foreign Application Priority Data

Jan. 15, 2019    (JP) .............................. JP2019-004654

(51) Int. Cl.
*H01M 4/66* (2006.01)
*H01M 10/0525* (2010.01)
*H01M 4/02* (2006.01)

(52) U.S. Cl.
CPC ........... *H01M 4/666* (2013.01); *H01M 4/661* (2013.01); *H01M 4/663* (2013.01); *H01M 4/667* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2016/0322635 A1* 11/2016 Kubota ............... H01M 4/0447

FOREIGN PATENT DOCUMENTS

| JP | H11158652 A | 6/1999 |
| JP | 2010-272287 A | 12/2010 |

\* cited by examiner

*Primary Examiner* — Wyatt P McConnell
(74) *Attorney, Agent, or Firm* — Dinsmore & Shohl LLP

(57) ABSTRACT

A negative electrode that enables resistance of a battery to be lowered is provided. The negative electrode disclosed herein includes a negative electrode current collector and a negative electrode mixture supported by the negative electrode current collector. The negative electrode mixture contains a negative electrode active material. The negative electrode current collector is made of copper or a copper alloy. A surface of the negative electrode current collector is coated by chromium. A coating amount A of chromium with respect to the negative electrode current collector is 5 μg/dm² or more and 60 μg/dm² or less. Blackness B of the negative electrode mixture is 3 or higher and 30 or lower. The coating amount A and the blackness B satisfy 60≤A×B≤900. The blackness B is a value obtained according to the disclosed method.

4 Claims, 2 Drawing Sheets

NEGATIVE ELECTRODE

CROSS-REFERENCE TO RELATED APPLICATIONS

The present application claims priority to Japanese Patent Application No. 2019-004654 filed on Jan. 15, 2019, the entire contents of which are incorporated herein by reference.

TECHNICAL FIELD

The present teaching relates to a negative electrode.

TECHNICAL BACKGROUND

In recent years, batteries such as lithium secondary batteries are suitably used as portable power supplies of personal computers, portable terminals, and the like as well as vehicle driving power supplies of electrical vehicles (EVs), hybrid vehicles (HVs), plug-in hybrid vehicles (PHVs), and the like.

Negative electrodes of typical batteries and, in particular, negative electrodes of lithium secondary batteries are generally configured such that a negative electrode mixture containing a negative electrode active material is supported by a negative electrode current collector.

Copper foil is generally used as the negative electrode current collector. Performing chromate treatment on copper foil is known as a way to improve rust resistance, adhesion with a negative electrode mixture layer, and charge-discharge cycle characteristics (for example, refer to Japanese Patent Application Laid-open No. H11-158652). In other words, coating a surface of copper foil with chromium (Cr) is known.

SUMMARY

As batteries (particularly, lithium secondary batteries) become more and more popular, there are demands for further improvements in performance. In particular, there are demands for ever lower battery resistances from the perspective of achieving higher outputs.

In consideration thereof, the present teaching provides a negative electrode that enables resistance of a battery to be lowered.

Intensive studies conducted by the present inventors revealed that a coating amount of chromium on a surface of a negative electrode current collector and blackness of a negative electrode mixture obtained by a particular measurement method affect battery resistance. It was also found that prescribing the coating amount of chromium and the blackness of the negative electrode mixture is insufficient and that a product of the coating amount and the blackness also affects battery resistance.

Specifically, a negative electrode disclosed herein includes a negative electrode current collector and a negative electrode mixture supported by the negative electrode current collector. The negative electrode mixture contains a negative electrode active material. The negative electrode current collector is made of copper or a copper alloy. A surface of the negative electrode current collector is coated by chromium. A coating amount A of chromium with respect to the negative electrode current collector is 5 $\mu g/dm^2$ or more and 60 $\mu g/dm^2$ or less. Blackness B of the negative electrode mixture is 3 or higher and 30 or lower. The coating amount A and the blackness B satisfy $60 \leq A \times B \leq 900$. The blackness B is a value obtained by: mixing the negative electrode mixture with deionized water of 10 times by mass and centrifugally separating the mixture; collecting supernatant liquid; measuring an absorption spectrum at an optical path length of 25 mm with respect to a specimen obtained by diluting the supernatant liquid by deionized water of 5 times by volume; and multiplying a sum of absorbances at respective wavelengths of 600 nm, 700 nm, 800 nm, and 900 nm in the absorption spectrum by 5.

According to the configuration described above, a negative electrode that enables resistance of a battery to be lowered is provided.

In embodiments of the negative electrode disclosed herein, the negative electrode active material is a carbon material.

In embodiments, the negative electrode disclosed herein is a negative electrode of a lithium secondary battery.

DETAILED DESCRIPTION

Figure 1:
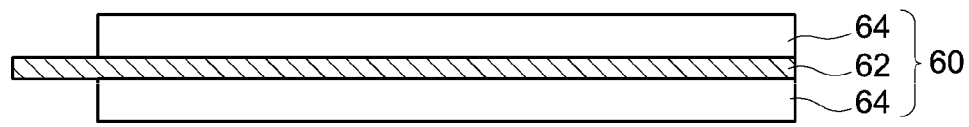
FIG. 1 is a sectional view schematically showing a negative electrode according to an embodiment of the present teaching.

Hereinbelow, an embodiment according to the present teaching will be described with reference to the drawings. It should be noted that any features other than matters specifically mentioned in the present specification and that may be necessary for carrying out the present teaching (for example, the general configuration of the negative electrode and manufacturing process thereof which do not characterize the present teaching) can be understood as design matters for a person skilled in the art which are based on the related art. The present teaching can be implemented based on contents disclosed in the present specification and common general technical knowledge in the related art. In addition, in the following drawings, members and portions which have the same functions are designated by the same reference numerals. Further, the dimensional relationship (length, width, thickness, and the like) in the individual drawings may not necessarily reflect the actual dimensional relationship.

FIG. 1 is a sectional view which schematically shows a negative electrode according to the present embodiment and which is perpendicular to a thickness direction.

A negative electrode 60 according to the present embodiment shown in FIG. 1 is a negative electrode of a lithium secondary battery.

In the present specification, "secondary battery" is a term which describes repetitively chargeable and dischargeable power storage devices in general and which encompasses so-called storage batteries and storage elements such as an electrical double layer capacitor.

In addition, in the present specification, "lithium secondary battery" refers to a secondary battery using lithium ions as charge carriers in which charging and discharging are realized by the movement of charge accompanying lithium ions between a positive electrode and a negative electrode.

As illustrated, the negative electrode 60 includes a negative electrode current collector 62 and a negative electrode mixture layer 64 supported by the negative electrode current collector 62. Specifically, the negative electrode 60 includes the negative electrode current collector 62 and the negative electrode mixture layer 64 provided on the negative electrode current collector 62. While the negative electrode mixture layer 64 may be provided only on one surface of the negative electrode current collector 62 or may be provided on both surfaces of the negative electrode current collector 62 as in the illustrated example, the negative electrode mixture layer 64 is provided on both surfaces of the negative electrode current collector 62 in embodiments. In addition, while a negative electrode mixture forms a layer as the negative electrode mixture layer 64 in the illustrated example, the negative electrode mixture may have a form other than a layer.

In embodiments, a shape of the negative electrode current collector 62 is a foil shape (or a sheet shape) as in the illustrated example. However, the negative electrode current collector 62 may have various forms such as a rod shape, a plate shape, and a mesh shape.

The negative electrode current collector 62 is made of copper or a copper alloy.

In embodiments, the negative electrode current collector 62 is a copper foil, and an electrolytic copper foil, a rolled copper foil, or the like may be used as the copper foil.

A surface of the negative electrode current collector 62 is coated by chromium (Cr). Studies conducted by the present inventors revealed that a coating amount (in the present specification, referred to as a "coating amount A" for the sake of convenience) of chromium on the surface of the negative electrode current collector 62 affects battery resistance. In consideration thereof, in the present embodiment, the coating amount A of chromium with respect to the negative electrode current collector 62 is 5 $\mu g/dm^2$ or more and 60 $\mu g/dm^2$ or less. When the coating amount A is less than 5 $\mu g/dm^2$, battery resistance increases. Battery resistance also increases when the coating amount A exceeds 60 $\mu g/dm^2$. The coating amount A can be determined by performing an analysis (for example, a fluorescence X-ray (XRF) analysis or an inductively coupled plasma (ICP) analysis) with respect to the negative electrode current collector 62 according to known methods. Copper foils with various coating amounts A are available as marketed products, and the coating amount A can be adjusted by varying conditions applied to chromate treatment performed when manufacturing the negative electrode current collector 62.

Dimensions of the negative electrode current collector 62 are not particularly limited and may be appropriately determined in accordance with battery design. When using a copper foil as the negative electrode current collector 62, a thickness of the copper foil is 6 $\mu m$ or more and 9 $\mu m$ or less in embodiments.

The negative electrode mixture layer 64 contains a negative electrode active material.

As the negative electrode active material, known negative electrode active materials used in lithium secondary batteries may be used. As the negative electrode active material, a carbon material such as graphite, hard carbon, or soft carbon may be used since effects of the present teaching can be obtained in a higher manner. In embodiments, the negative electrode active material may be graphite. Graphite may be either natural graphite or artificial graphite or may be amorphous carbon-coated graphite formed by coating graphite with an amorphous carbon material.

An average particle diameter of the negative electrode active material is not particularly limited and may be more or less the same as that of conventional lithium secondary batteries. In embodiments, the average particle diameter of the negative electrode active material is 50 $\mu m$ or less, or 1 $\mu m$ or more and 20 $\mu m$ or less, or even 5 $\mu m$ or more and 15 $\mu M$ or less.

It should be noted that, in the present specification, an "average particle diameter" refers to a particle diameter (D50) having a cumulative frequency of 50% in percentage by volume in a particle size distribution measured by a laser diffraction scattering method unless otherwise noted.

In addition, a BET specific surface area of the negative electrode active material is not particularly limited and can be 1.5 $m^2/g$ or more, or even 2.5 $m^2/g$ or more. On the other hand, in embodiments, the BET specific surface area is 10 $m^2/g$ or less, or even 6 $m^2/g$ or less.

It should be noted that, in the present specification, a "BET specific surface area" refers to a value obtained by analyzing, by a BET method, an amount of adsorbed gas measured by a gas adsorption method (a constant-volume adsorption method) using nitrogen ($N_2$) gas as an adsorbate.

While a content by percentage of the negative electrode active material in the negative electrode mixture layer 64 (in other words, a content by percentage of the negative electrode active material relative to a total mass of the negative electrode mixture layer 64) is not particularly limited, and in embodiments, the content by percentage is 70% by mass or higher, 80% by mass or higher and 99.5% by mass or lower, or even 85% by mass or higher and 99% by mass or lower.

The negative electrode mixture layer 64 may contain a binder.

As the binder, for example, styrene butadiene rubber (SBR) may be used.

While a content by percentage of the binder in the negative electrode mixture layer 64 is not particularly limited, in embodiments, the content by percentage is 0.1% by mass or higher and 8% by mass or lower, or even 0.2% by mass or higher and 3% by mass or lower.

The negative electrode mixture layer 64 may contain components other than the negative electrode active material and the binder. Examples of such components include a thickener.

As the thickener, for example, carboxymethyl cellulose (CMC) may be used.

While a content by percentage of the thickener in the negative electrode mixture layer 64 is not particularly limited, in embodiments, the content by percentage is 0.3% by mass or higher and 3% by mass or lower, or even 0.4% by mass or higher and 2% by mass or lower.

While a thickness of the negative electrode mixture layer 64 per one surface of the negative electrode current collector 62 is not particularly limited, in embodiments, the thickness is 40 $\mu m$ or more, or even 50 $\mu m$ or more. On the other hand, in embodiments, the thickness is 100 $\mu m$ or less, or even 80 $\mu m$ or less.

In addition, while a density of the negative electrode mixture layer 64 is not particularly limited, in embodiments, the density is 0.5 $\mu g/cm^3$ or higher or even 1 $\mu g/cm^3$ or higher. On the other hand, in embodiments, the density is 2.5 $\mu g/cm^3$ or lower or even 2 $g/cm^3$ or lower.

Studies conducted by the present inventors revealed that blackness (in the present specification, referred to as "blackness B" for the sake of convenience) of a negative electrode mixture as obtained by a particular method affects battery resistance. In consideration thereof, in the present embodiment, the blackness B of the negative electrode mixture (the negative electrode mixture layer 64) is 3 or higher and 30 or lower. When the blackness B is lower than 3, battery resistance increases. Battery resistance also increases when the blackness B exceeds 30.

The blackness B is a value obtained by: mixing the negative electrode mixture layer 64 with deionized water of 10 times by mass and centrifugally separating the mixture; collecting supernatant liquid; measuring an absorption spectrum at an optical path length of 25 mm with respect to a specimen obtained by diluting the supernatant liquid by deionized water of 5 times by volume; and multiplying a sum of absorbances at respective wavelengths of 600 nm, 700 nm, 800 nm, and 900 nm in the absorption spectrum by 5. Specifically, for example, an actual analysis can be conducted as follows. A battery is dismantled and the negative electrode mixture layer 64 is extracted. The negative electrode mixture layer 64 is mixed with deionized water of 10 times by mass, and the mixture is centrifugally separated for 30 minutes or longer at a centrifugal force of 10,000 G or more using a centrifuge. Supernatant liquid is collected and the supernatant liquid is diluted to 5 times by volume with deionized water. A part of the diluted liquid is collected as a specimen, an absorption spectrum of the specimen is measured at an optical path length of 25 mm using a known spectrophotometer, a sum of absorbances at the respective wavelengths of 600 nm, 700 nm, 800 nm, and 900 nm is calculated, and the sum is multiplied by 5.

The larger the value of blackness, the higher the absorbance (in other words, the lower the light transmission), and the absorbance is derived from components contained in the negative electrode mixture layer 64. Conceivably, the more favorable a dispersed state of the respective components (in particular, the negative electrode active material) of the negative electrode active material 64, the larger the amount of components that do not precipitate due to centrifugal separation and, accordingly, the higher the blackness. Therefore, a state of the negative electrode mixture layer can conceivably be represented by blackness. Blackness can be adjusted by, for example, controlling a dispersed state of a negative electrode paste when fabricating the negative electrode mixture layer 64. The dispersed state of a negative electrode paste can be readily controlled by using a thickener and adjusting a type and an amount thereof.

Furthermore, studies conducted by the present inventors revealed that prescribing the coating amount A of chromium with respect to the negative electrode current collector and the blackness B of the negative electrode mixture layer is insufficient and that a product of the coating amount A and the blackness B also affects battery resistance. In consideration thereof, in the present embodiment, the coating amount A and the blackness B satisfy $60 \leq A \times B \leq 900$. When the product of the coating amount A and the blackness B is less than 60, battery resistance increases. Battery resistance also increases when the product of the coating amount A and the blackness B exceeds 900.

A manufacturing method of the negative electrode according to the present embodiment is not particularly limited. Blackness of a negative electrode paste has a similar value to blackness of the negative electrode mixture layer. In consideration thereof, the negative electrode can be manufactured by a method including the steps of: fabricating a negative electrode paste containing a negative electrode active material; applying the negative electrode paste on the negative electrode current collector 62; and forming the negative electrode mixture layer 64 by drying the applied negative electrode paste, wherein the negative electrode current collector 62 is made of copper or a copper alloy, a surface of the negative electrode current collector 62 is coated by chromium, the coating amount A of chromium with respect to the negative electrode current collector 62 is 5 μg/dm$^2$ or more and 60 μg/dm$^2$ or less, blackness B' of the negative electrode paste is 3 or higher and 30 or lower, and the coating amount A and the blackness B' satisfy $60 \leq A \times B' \leq 900$. In this case, the blackness B' of the negative electrode paste is a value obtained by: mixing the negative electrode paste with deionized water of 10 times by mass and centrifugally separating the mixture; collecting supernatant liquid; measuring an absorption spectrum at an optical path length of 25 mm with respect to a specimen obtained by diluting the supernatant liquid to 5 times by volume; and multiplying a sum of absorbances at wavelengths of 600 nm, 700 nm, 800 nm, and 900 nm in the absorption spectrum by 5.

This method can be performed in a similar manner to conventional methods with the exception of using a negative electrode current collector and a negative electrode paste in which the coating amount A of chromium and the blackness B' satisfy the relationships described above.

The blackness B' of the negative electrode paste has a similar value to the blackness B of the negative electrode mixture layer. Therefore, the blackness B' may be an indicator that represents a state of the negative electrode paste.

In consideration thereof, from another aspect, the technical ideas pertaining to the negative electrode according to the present embodiment can be applied as an inspection method of a negative electrode. The inspection method includes the steps of: measuring a coating amount of chromium on a surface of a negative electrode current collector made of copper or a copper alloy: measuring the blackness B of a negative electrode mixture; and determining that the negative electrode is non-defective when the coating amount A of chromium is 5 μg/dm$^2$ or more and 60 μg/dm$^2$ or less, the blackness B of the negative electrode mixture is 3 or higher and 30 or lower, and the coating amount A and the blackness B satisfy $60 \leq A \times B \leq 900$. Alternatively, the technical ideas pertaining to the negative electrode according to the present embodiment can be applied as an inspection method of a material for manufacturing a negative electrode, the inspection method including the steps of: measuring a coating amount of chromium on a surface of a negative electrode current collector made of copper or a copper alloy; measuring the blackness B' of a negative electrode paste; and determining that the material for manufacturing a negative electrode is non-defective when the coating amount A of chromium is 5 μg/dm$^2$ or more and 60 μg/dm$^2$ or less, the blackness B' of the negative electrode paste is 3 or higher and 30 or lower, and the coating amount A and the blackness B' satisfy $60 \leq A \times B' \leq 900$. In this case, the blackness B and the blackness B' are as described earlier.

A battery including the negative electrode 60 according to the present embodiment has low resistance (in particular, low initial resistance).

In consideration thereof, a battery including the negative electrode 60 according to the present embodiment will be described below with reference to FIGS. 2 and 3 using an example of a lithium secondary battery.

Figure 2:
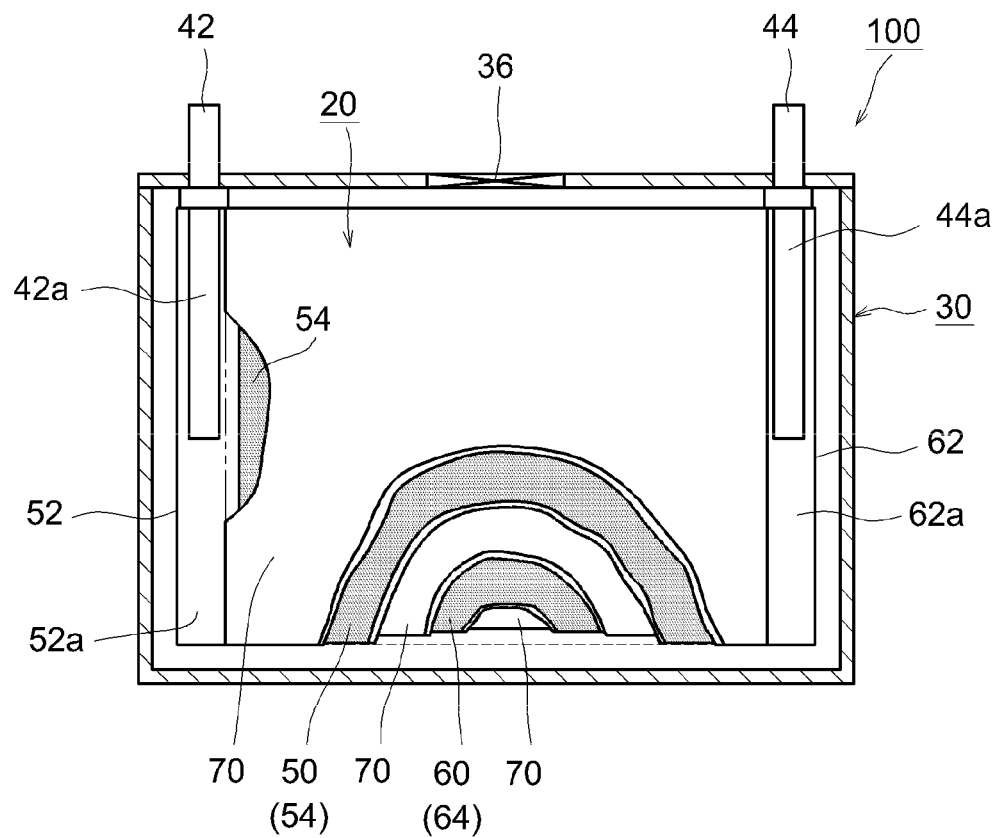
FIG. 2 is a sectional view schematically showing an internal structure of a lithium secondary battery using the negative electrode according to the embodiment of the present teaching.

A lithium secondary battery 100 shown in FIG. 2 is a sealed lithium secondary battery 100 constructed by housing a flat-shaped wound electrode body 20 and a nonaqueous electrolyte (not illustrated) in a flat square battery case (in other words, an outer container) 30. The battery case 30 is provided with a positive electrode terminal 42 and a negative electrode terminal 44 for external connection and a thin safety valve 36 configured so as to release internal pressure of the battery case 30 when the internal pressure rises to or exceeds a prescribed level. The battery case 30 is also provided with an injection port (not illustrated) for injecting the nonaqueous electrolyte. The positive electrode terminal 42 is electrically connected to a positive electrode current collecting plate 42a. The negative electrode terminal 44 is electrically connected to a negative electrode current collecting plate 44a. As a material of the battery case 30, for example, a lightweight metallic material with good thermal conductivity such as aluminum is used.

Figure 3:
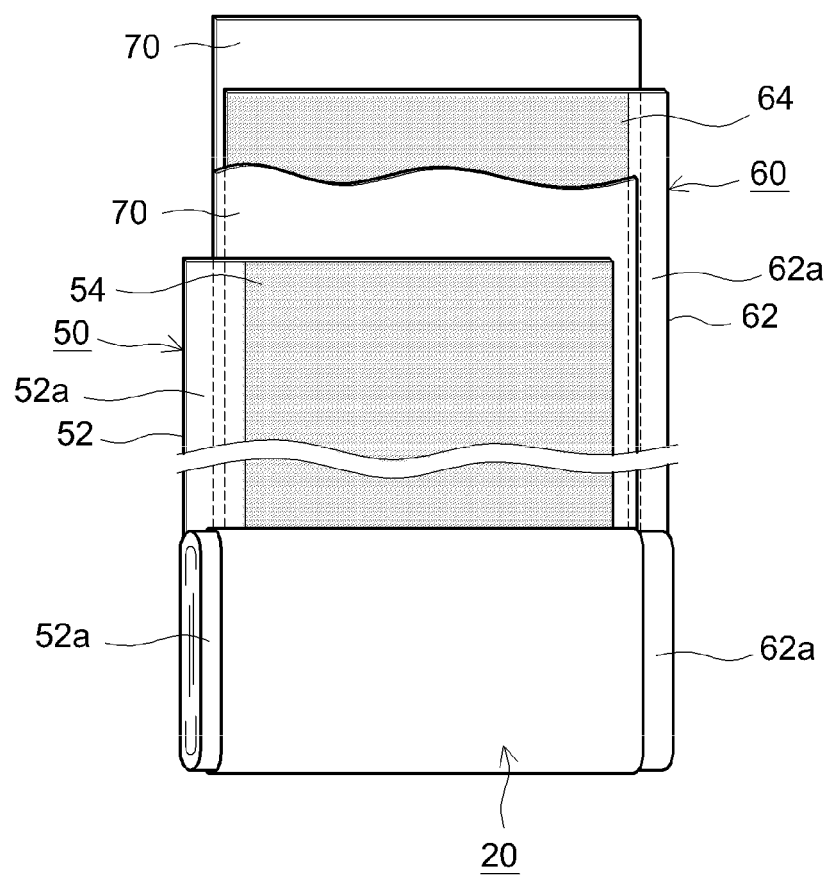
FIG. 3 is a schematic view showing a configuration of a wound electrode body of the lithium secondary battery shown in FIG. 2.

As shown in FIGS. 2 and 3, the wound electrode body 20 has a form in which a positive electrode sheet 50 having a positive electrode mixture layer 54 formed in a lengthwise direction on one surface or both surfaces (in this case, both surfaces) of an elongated positive electrode current collector 52 and a negative electrode sheet 60 having the negative electrode mixture layer 64 formed in the lengthwise direction on one surface or both surfaces (in this case, both surfaces) of the elongated negative electrode current collector 62 are laminated via two elongated separator sheets 70 and wound in the lengthwise direction. The positive electrode current collecting plate 42a and the negative electrode current collecting plate 44a are respectively joined to a positive electrode mixture layer unformed portion 52a (in other words, a portion where the positive electrode mixture layer 54 has not been formed and the positive electrode current collector 52 is exposed) and a negative electrode mixture layer unformed portion 62a (in other words, a portion where the negative electrode mixture layer 64 has not been formed and the negative electrode current collector 62 is exposed) which are formed so as to protrude outward from both ends in a winding axis direction (in other words, a sheet width direction that is perpendicular to the lengthwise direction) of the wound electrode body 20.

Examples of the positive electrode current collector 52 constituting the positive electrode sheet 50 include an aluminum foil.

The positive electrode mixture layer 54 contains a positive electrode active material. Examples of the positive electrode active material include lithium transition metal oxides (for example, $LiNi_{1/3}Co_{1/3}Mn_{1/3}O_2$, $LiNiO_2$, $LiCoO_2$, $LiFeO_2$, $LiMn_2O_4$, and $LiNi_{0.5}Mn_{1.5}O_4$) and lithium transition metal phosphate compounds (for example, $LiFePO_4$).

The positive electrode mixture layer 54 may contain components other than the positive electrode active material such as lithium phosphate, a conductive material, and a binder. As the conductive material, carbon black such as acetylene black (AB) and other carbon material (such as graphite) may be used. As the binder, polyvinylidene fluoride (PVDF) or the like may be used.

As the negative electrode sheet 60, the negative electrode 60 according to the embodiment described above is used. In the negative electrode sheet 60 according to the present configuration example, the negative electrode mixture layer 64 is formed on both surfaces of the negative electrode current collector 62.

Examples of the separator 70 include a porous sheet (film) made of a resin such as polyethylene (PE), polypropylene (PP), polyester, cellulose, or polyamide. The porous sheet may have a single layer structure or a laminate structure of two layers or more (for example, a three-layered structure in which a PP layer is laminated on both sides of a PE layer). A heat-resistant layer (HRL) may be provided on a surface of the separator 70.

The nonaqueous electrolyte may contain a nonaqueous solvent and a supporting salt.

As the nonaqueous solvent, various organic solvents such as carbonates, ethers, esters, nitriles, sulfones, and lactones used in an electrolyte solution of a general lithium secondary battery can be used without particular limitations. Specific examples include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluorodimethyl carbonate (TFDMC). One of such nonaqueous solvents may be used independently or two or more may be appropriately used in combination.

As the supporting salt, for example, a lithium salt such as $LiPF_6$, $LiBF_4$, or $LiClO_4$ can be used. In embodiments, the supporting salt can be $LiPF_6$. In embodiments, a concentration of the supporting salt is 0.7 mol/L or higher and 1.3 mol/L or lower.

It should be noted that the nonaqueous electrolyte described above may contain components other than those described above including various additives such as biphenyl (BP), cyclohexylbenzene (CHB), and other gas generating agents or thickeners insofar as the effects of the present teaching are not significantly impaired.

The lithium secondary battery 100 configured as described above can be used in various applications. Applications include a driving power supply mounted to a vehicle such as an electrical vehicle (EV), a hybrid vehicle (HV), or a plug-in hybrid vehicle (PHV). The lithium secondary battery 100 may also be used in the form of a battery pack formed by connecting a plurality of the lithium secondary batteries 100 in series and/or in parallel.

The square lithium secondary battery 100 including the flat-shaped wound electrode body 20 has been described as an example. However, a lithium secondary battery can also be configured as a lithium secondary battery including a stacked-type electrode body. In addition, a lithium secondary battery can also be configured as a cylindrical lithium secondary battery, a laminate-type lithium secondary battery, and the like.

Furthermore, while the negative electrode 60 according to the present embodiment can be a negative electrode of a lithium secondary battery, the negative electrode 60 can also be used as an electrode of other batteries, in which case the other batteries can be configured according to known methods.

Although the following provides an explanation of several Examples related to the present teaching, the present teaching is not intended to be limited by the contents indicated in these Examples.

Fabrication of Negative Electrode of Each Example and Each Comparative Example

Graphite coated with an amorphous carbon material was prepared as a negative electrode active material. A negative electrode paste was prepared by mixing the graphite (C), styrene butadiene rubber (SBR) as a binder, and carboxymethyl cellulose (CMC) as a thickener with deionized water at a mass ratio of C:SBR:CMC=98:0.7:0.5. The negative electrode paste was applied in strips on both sides of an elongated copper foil with a thickness of 8 μm and dried, and subsequently pressed to fabricate a negative electrode sheet of each Example and each Comparative Example. In this case, copper foils having a chromium coating amount A (a Cr amount A) shown in Table 1 were used as the copper foil.

Measurement of Blackness of Negative Electrode Mixture

A negative electrode mixture layer of each fabricated negative electrode sheet was peeled off from the copper foil. Subsequently, the negative electrode mixture layer was mixed with deionized water of 10 times by mass. The mixture was centrifugally separated for 30 minutes at a centrifugal force of 10,000 G or more using a centrifuge. Separated supernatant liquid was collected and diluted by deionized water of 5 times by volume to prepare a measurement specimen. An absorption spectrum of the specimen was measured at an optical path length of 25 mm using a spectrophotometer. In the obtained absorption spectrum, absorbances at wavelengths of 600 nm, 700 nm, 800 nm, and 900 nm were respectively determined. The values of the absorbances were added up, and a value obtained by multiplying the sum by 5 was adopted as the blackness B of the negative electrode mixture.

Fabrication of Lithium Secondary Battery for Evaluation

A positive electrode paste was prepared by mixing $LiNi_{0.34}Co_{0.33}Mn_{0.33}O_2$ (LNCM) as a positive electrode active material, trilithium phosphate ($Li_3PO_4$), acetylene black (AB) as a conductive material, and polyvinylidene fluoride (PVDF) as a binder in N-methyl pyrrolidone (NMP) at a mass ratio of LNCM:$Li_3PO_4$:AB:PVDF=87:3:8:2. The positive electrode paste was applied in strips on both sides of an elongated aluminum foil with a thickness of 15 µm and dried, and subsequently pressed to fabricate a positive electrode sheet.

In addition, two separator sheets (porous polyolefin sheets) were prepared.

The fabricated positive electrode sheet described above, the negative electrode sheet of each Example and each Comparative Example, and the two prepared separator sheets were laminated and wound to fabricate a wound electrode body. Electrode terminals were respectively attached to the positive electrode sheet and the negative electrode sheet, and the resultant was housed in a battery case having an injection port.

Next, a nonaqueous electrolyte was injected from the injection port of the battery case and the injection port was hermetically sealed. As the nonaqueous electrolyte, a nonaqueous electrolyte prepared by dissolving $LiPF_6$ as a supporting salt at a concentration of 1.0 mol/L into a mixed solvent containing ethylene carbonate (EC), ethyl methyl carbonate (EMC), and dimethyl carbonate (DMC) at a volume ratio of 3:4:3 was used.

The lithium secondary battery for evaluation was obtained in this manner.

Initial Resistance Measurement

Each lithium secondary battery for evaluation fabricated as described above was subjected to an initial charge-discharge process.

Each lithium secondary battery for evaluation was adjusted to State of Charge (SOC) 27% and subsequently placed in a temperature environment of 25° C. Each lithium secondary battery for evaluation was discharged for 10 seconds at a rate of 10 C, and a resistance value was obtained from a discharge curve of the discharge.

A ratio of a resistance value of each lithium secondary battery for evaluation when a resistance value of Example 3 as a standard is assumed to have a value of 100 was calculated. Results thereof are shown in Table 1.

TABLE 1

| | Cr amount A of copper foil (µg/dm$^2$) | Blackness B of negative electrode mixture | Cr amount A × blackness B | Initial resistance ratio |
|---|---|---|---|---|
| Comparative Example 1 | 3 | 15 | 45 | 110 |
| Example 1 | 20 | 3 | 60 | 99 |
| Example 2 | 5 | 15 | 75 | 101 |
| Example 3 | 20 | 15 | 300 | 100 |
| Example 4 | 20 | 30 | 600 | 98 |
| Example 5 | 40 | 15 | 600 | 102 |
| Example 6 | 60 | 15 | 900 | 102 |
| Comparative Example 2 | 20 | 45 | 900 | 115 |
| Comparative Example 3 | 20 | 60 | 1200 | 152 |
| Comparative Example 4 | 80 | 15 | 1200 | 110 |
| Comparative Example 5 | 60 | 30 | 1800 | 185 |

From comparisons among the results of Comparative Examples 1 and 4 and Examples 2, 3, 5, and 6 in which the blackness B is fixed at 15, it can be ascertained that battery resistance tends to be low when the coating amount A of chromium is 5 µg/dm$^2$ or more and 60 µg/dm$^2$ or less. In addition, from comparisons among Examples 1, 3, and 4 and Comparative Examples 2 and 3 in which the coating amount A of chromium on the copper foil is fixed at 20 µg/dm$^2$, it can be ascertained that battery resistance tends to be low when the blackness B is 3 or more and 30 or less. On the other hand, from the result of Comparative Example 5, it can be ascertained that there are cases where battery resistance does not decrease even when the coating amount A of chromium is 5 µg/dm$^2$ or more and 60 µg/dm$^2$ or less and the blackness B is 3 or more and 30 or less.

The above indicates that battery resistance decreases when the coating amount A of chromium with respect to the negative electrode current collector is 5 µg/dm$^2$ or more and 60 µg/dm$^2$ or less, the blackness B of the negative electrode mixture is 3 or more and 30 or less, and the coating amount A and the blackness B satisfy $60 \leq A \times B \leq 900$, as Examples 1 to 6.

In other words, it is shown that, according to the negative electrode disclosed herein, resistance of a battery can be lowered.

Although the specific examples of the present teaching have been described above in detail, these are merely examples and do not limit the scope of the claims. The art set forth in the claims includes various changes and modifications of the specific examples illustrated above.

What is claimed is:

1. A negative electrode comprising:
   a negative electrode current collector; and a negative electrode mixture supported by the negative electrode current collector, wherein
   the negative electrode mixture contains a negative electrode active material,
   the negative electrode current collector is made of copper or a copper alloy,
   a surface of the negative electrode current collector is coated by chromium,
   a coating amount A of chromium with respect to the negative electrode current collector is 5 µg/dm$^2$ or more and 60 µg/dm$^2$ or less,
   blackness B of the negative electrode mixture is 3 or higher and 30 or lower,
   the coating amount A and the blackness B satisfy $60 \leq A \times B \leq 900$, and
   the blackness B is a value obtained by: mixing the negative electrode mixture with deionized water of 10 times by mass and centrifugally separating the mixture; collecting supernatant liquid; measuring an absorption spectrum at an optical path length of 25 mm with respect to a specimen obtained by diluting the supernatant liquid by deionized water of 5 times by volume; and multiplying a sum of absorbances at respective wavelengths of 600 nm, 700 nm, 800 nm, and 900 nm in the absorption spectrum by 5.

2. The negative electrode according to claim 1, wherein the negative electrode active material is a carbon material.

3. The negative electrode according to claim 1, wherein the negative electrode is a negative electrode of a lithium secondary battery.

4. The negative electrode according to claim 2, wherein the negative electrode is a negative electrode of a lithium secondary battery.

* * * * *